(12) United States Patent
Howard et al.

(10) Patent No.: US 11,215,529 B1
(45) Date of Patent: Jan. 4, 2022

(54) REMOTE MONITORING OF ENGINE PERFORMANCE USING ACCELEROMETERS

(71) Applicant: Windrock, Inc., Knoxville, TN (US)

(72) Inventors: Brian F. Howard, Reno, NV (US); Mary Margaret Chapman, Knoxville, TN (US); Michael W. Jones, Knoxville, TN (US); Patrick Juneji Sullivan, Knoxville, TN (US); Jeffrey Dylan Abel, Knoxville, TN (US); Richard Paul Beam, Knoxville, TN (US)

( * ) Notice: Subject to any disclaimer, the term of this patent is extended or adjusted under 35 U.S.C. 154(b) by 0 days.

(21) Appl. No.: 16/587,379

(22) Filed: Sep. 30, 2019

Related U.S. Application Data

(60) Provisional application No. 62/738,265, filed on Sep. 28, 2018, provisional application No. 62/806,923, filed on Feb. 18, 2019.

(51) Int. Cl.
| | |
|---|---|
| *G01M 15/06* | (2006.01) |
| *G01M 15/05* | (2006.01) |
| *F02D 35/02* | (2006.01) |
| *G01M 15/12* | (2006.01) |
| *G01M 15/11* | (2006.01) |

(52) U.S. Cl.
CPC ........... *G01M 15/05* (2013.01); *F02D 35/027* (2013.01); *F02D 35/028* (2013.01); *G01M 15/06* (2013.01); *G01M 15/11* (2013.01); *G01M 15/12* (2013.01); *F02D 2200/025* (2013.01); *F02D 2200/101* (2013.01); *F02D 2200/1015* (2013.01)

(58) Field of Classification Search
CPC . F02D 2200/025; G01M 15/05; G01M 15/06; G01M 15/11; G01M 15/12
See application file for complete search history.

(56) References Cited

U.S. PATENT DOCUMENTS

| | | | | |
|---|---|---|---|---|
| 5,817,928 | A * | 10/1998 | Garvey, III | G01N 33/2888 73/53.05 |
| 6,273,064 | B1 * | 8/2001 | Scholl | G01L 23/222 123/406.24 |
| 7,810,469 | B2 * | 10/2010 | Vigild | F02D 35/027 123/406.26 |
| 8,522,750 | B2 * | 9/2013 | Flanagan | F02D 35/023 123/435 |

(Continued)

*Primary Examiner* — Eric S. McCall
(74) *Attorney, Agent, or Firm* — Robinson IP Law, PLLC

(57) ABSTRACT

A method for aligning cycles of an engine conditioning monitoring system includes: receiving data corresponding to a TDC angle of an engine from a crank angle sensor; receiving data from one or more accelerometers for each cylinder of the engine, the received data including vibration amplitude data; analyzing vibration amplitude data from the one or more accelerometers in relation to data corresponding to the TDC angle of the engine; characterizing vibration data using segmental band analysis, wherein segmental bands of the segmental band analysis correspond to valve closure angles of the engine; identify cylinders for which analyzed vibration amplitude data in relation to the TDC angle of the engine are out of phase; and align vibration amplitude data by shifting analyzed vibration amplitude data relative to the TDC angle of the engine such that vibration amplitude data is aligned with the TDC angle of the engine.

8 Claims, 10 Drawing Sheets

(56) References Cited

U.S. PATENT DOCUMENTS

| | | | |
|---|---|---|---|
| 9,890,732 B2* | 2/2018 | Younkins | F02D 13/06 |
| 9,933,334 B2* | 4/2018 | Rivellini | G01M 15/06 |
| 2008/0051975 A1* | 2/2008 | Ker | G01M 15/12 |
| | | | 701/102 |
| 2017/0010173 A1* | 1/2017 | Bizub | F02D 41/22 |
| 2019/0128200 A1* | 5/2019 | Nagappa | F02D 41/1498 |
| 2019/0226416 A1* | 7/2019 | Zurlo | G01M 15/12 |
| 2019/0383705 A1* | 12/2019 | Smart | G01H 1/00 |

* cited by examiner

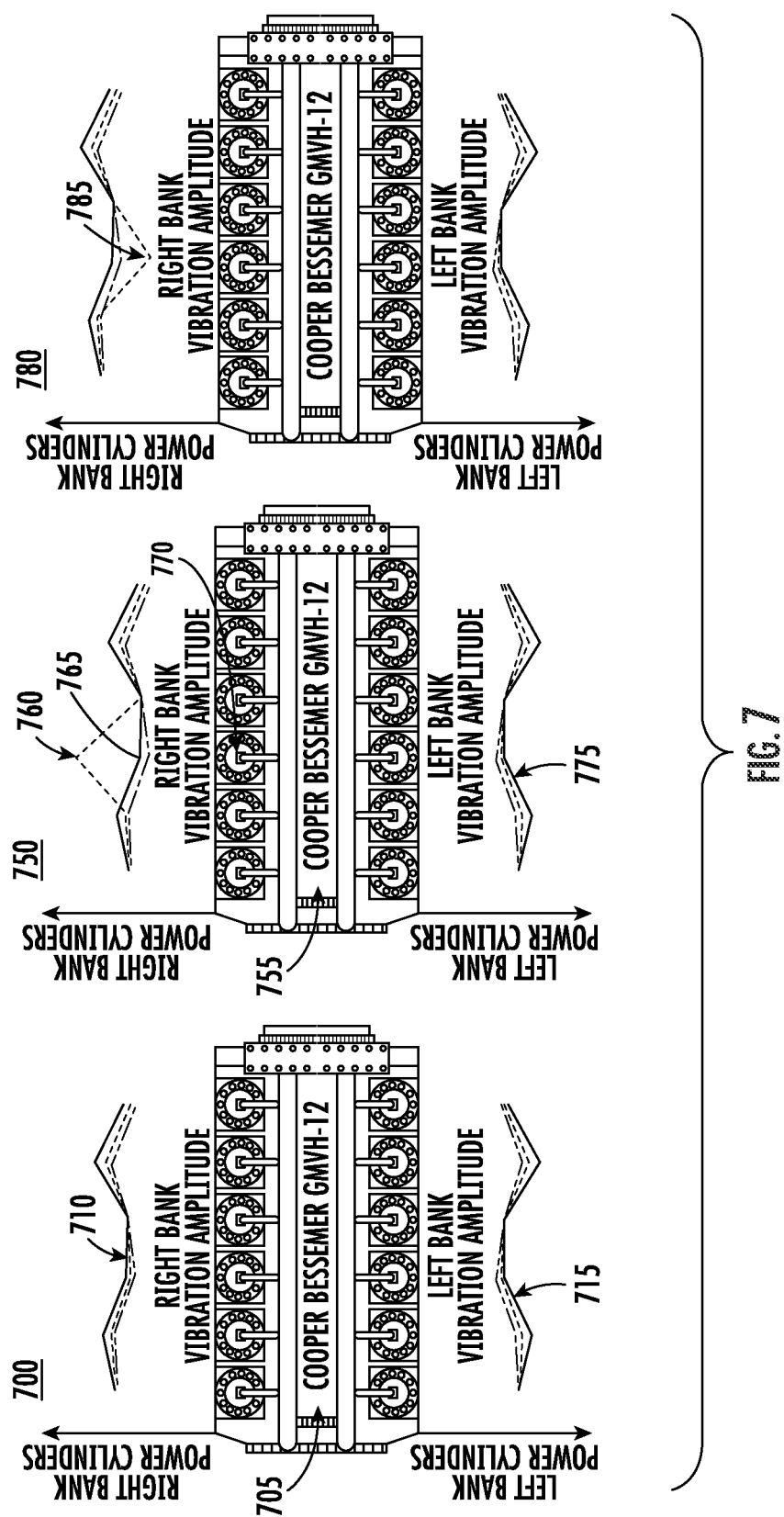

REMOTE MONITORING OF ENGINE PERFORMANCE USING ACCELEROMETERS

CROSS-REFERENCES TO RELATED APPLICATIONS

This application claims priority to and is a non-provisional of U.S. Provisional Patent Application Ser. No. 62/738,265 for "Remote Monitoring Engine Performance Using Accelerometers" filed on Sep. 28, 2018, and claims priority to and is a non-provisional of U.S. Provisional Patent Application Ser. No. 62/806,923 for a "Method and Apparatus for Graphical Display of Engine Cylinder Health" filed on Feb. 18, 2019, the contents of which are incorporated herein by reference in their entireties.

BACKGROUND AND FIELD

Existing products, such as Windrock MD from Windrock Inc., Prognost®-NT from PROGNOST Systems GmbH, and Machinery Health™ Manager from Emerson Process Management, present images, charts, graphs, and tables that enable highly trained specialists to view and analyze condition monitoring information collected from rotating and reciprocating machinery systems including high speed engines (HSE).

In-cylinder pressure transducers have long been used to monitor engine performance. For example, U.S. Pat. No. 8,522,750 (Flanagan et. al.) describes monitoring large bore internal combustion engines primarily by sensing pressure within the cylinder and outputting a signal representing the cylinder pressure. U.S. Pat. No. 9,890,732 (Younkins et. al.) also uses pressure to detect valve faults.

Vibration and knock sensors have also been used to monitor engine performance. In U.S. Pat. No. 9,933,334 (Rivellini) teaches use of a vibration knock sensor mounted inside the engine to drive a vibration signal to measure cylinder head acceleration.

U.S. Pat. No. 7,810,469 (Vigild et. al.) teaches estimating combustion phasing and control based on signal from an engine vibration sensor to derive an energy factor vector. U.S. Pat. No. 6,273,064 (Scholl et. al.) uses an engine mounted accelerometer to detect engine block vibrations and thereby measure combustion energy.

"Engine Fault Detection Using Vibration Signal Reconstruction in the Crank Angle Domain" by Arasaratnam et. al. describes signal processing techniques for identifying and locating manufacturing defects within an engine.

"Accelerometer Signals for Diagnosis in Diesel Engines" by Carlucci et. al. describes correlation of block vibration measurements with traditional in-cylinder pressure measurements.

"Detection of Combustion Properties in Diesel Engines Using Block Mounted Accelerometers" by Andersson et. al. teaches how accelerometer signals may be used to estimate combustion phasing parameters for heavy duty diesel engines.

With respect to dynamic graphical icons relating to condition monitoring information, U.S. Pat. No. 5,817,928 (Garvey et al.) employs a Cartesian graph for placing a data point along a respective category axis.

These sources have demonstrated valuable condition monitoring information from employing non-intrusively mounted accelerometers on internal combustion engines to monitor different aspects of performance and machine health.

While relatively affordable, existing engine monitoring systems are not easily comprehended or understood by persons not skilled and experienced in recognizing, interpreting, and applying the images, charts, graphs, and tables for the particular machinery of interest. It is commonly expected that a newcomer understands the machinery being monitored and who desires to use one of the state-of-the-art systems will need training and gain experience before they are able to begin using one of those systems. A typical progression for the newcomer is to attend lengthy annual training before they are confident, experienced, and trusted within a technology peer group.

Interpreting information found in engine condition monitoring waveforms and spectra systems is not intuitive for many industrial professionals who are well experienced in engine operation and repair. Existing condition monitoring images, charts, graphs, and tables are not intuitive for financial analysts, procurement specialists, management professionals, or for asset owners who are not trained and experienced with understanding and interpreting the "squiggly lines."

Owners and users of large bore internal combustion engines will benefit greatly from far broader aftermarket use of installed accelerometer-based monitoring systems. To achieve broader aftermarket, use there are several important improvements that should be made in the monitoring system and in its implementation.

Systems today are highly complex, and engine operators are not sophisticated vibration analysts. They do not have knowledge or understanding of the tools and techniques for data collection and data analysis, information extraction, observations, and recommended actions.

What is needed, therefore, are systems and methods for enabling owners and operators to receive automated alerts and, upon receiving an alert, allowing an owner or other interested persons to view observations, actions, and recommendations.

SUMMARY

Systems and methods are described herein for monitoring of engine performance using sensors such as accelerometers. In a first aspect, a method for aligning cycles of an engine conditioning monitoring system includes: receiving data corresponding to a TDC angle of an engine from a crank angle sensor in sensory contact with the engine; receiving data from one or more accelerometers in sensory contact with each cylinder of the engine, the received data including vibration amplitude data; analyzing vibration amplitude data from the one or more accelerometers in relation to data corresponding to the TDC angle of the engine; characterizing vibration data from the one or more accelerometers using segmental band analysis, wherein segmental bands of the segmental band analysis correspond to valve closure angles of the engine; identify cylinders for which analyzed vibration amplitude data in relation to the TDC angle of the engine are out of phase; and align vibration amplitude data by shifting analyzed vibration amplitude data relative to the TDC angle of the engine such that vibration amplitude data is aligned with the TDC angle of the engine.

In one embodiment, the method of aligning cycles of an engine condition monitoring system further include providing a visual interface on a display of a computer and visually displaying vibration amplitude data on the display of the computer.

In a second aspect, a method for analyzing performance of an engine includes: receiving data corresponding to a TDC angle of an engine from a crank angle sensor in sensory contact with the engine; receiving data from one or more accelerometers in sensory contact with each cylinder of the engine, the received data including vibration amplitude data; aligning received data corresponding to the TDC angle of the engine with received data from the one or more accelerometers; applying segmental banding to the aligned received data corresponding to the TDC angle of the engine and the received data from the one or more accelerometers; analyzing vibration amplitude data from the one or more accelerometers to determine one or more parameters for segmental bands; identifying one or more event indications based on the one or more parameters for segmental bands, the one or more event indications selected from the group consisting of piston slap, detonation, exhaust blowdown, exhaust valve, intake valve, fuel valve, compression leak, pin abnormality, rod abnormality, bushing abnormality, bearing abnormality, or no event indication; and deriving a KPI score for a health category of the engine based on the one or more identified event indications, the health category selected from the group consisting of valve train health, combustion health, and running gear health.

In a third aspect, a method of visually displaying engine cylinder health data to an operator of the engine includes: receiving data corresponding to a TDC angle of an engine from a crank angle sensor in sensory contact with the engine; receiving data from one or more accelerometers in sensory contact with each cylinder of the engine, the received data including vibration amplitude data; aligning received data corresponding to the TDC angle of the engine with received data from the one or more accelerometers; applying segmental banding to the aligned received data corresponding to the TDC angle of the engine and the received data from the one or more accelerometers; analyzing vibration amplitude data from each segmental band to generate a health score for each segmental band; displaying a visual representation of the engine including a visual representation of relative positions each cylinder of the engine; and displaying a visual graph in proximity to the displayed visual representation of the engine, the visual graph displaying relative amplitudes for health scores for each segmental band.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

Figure 5:
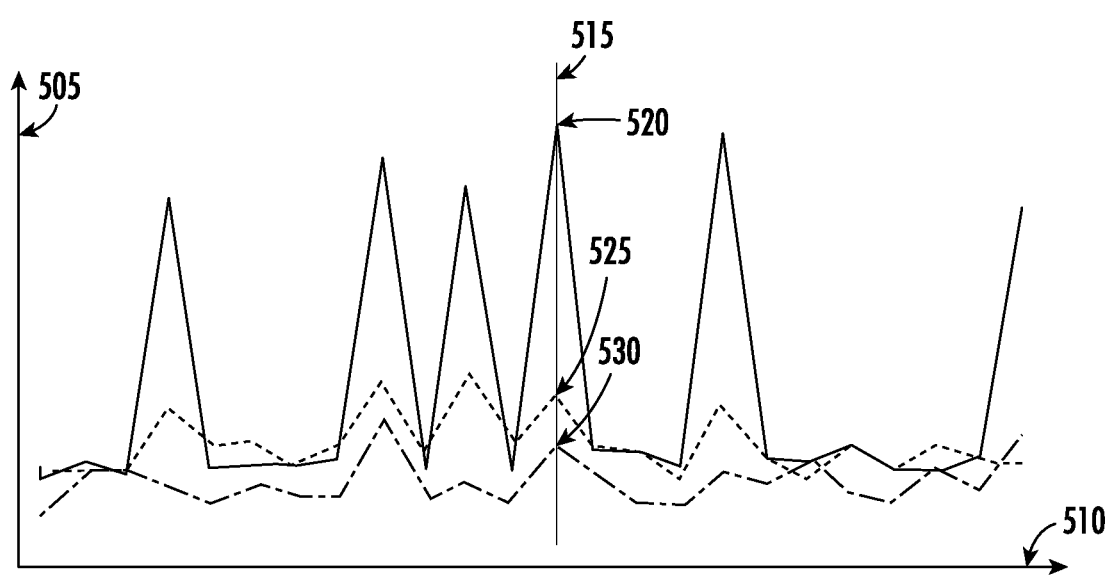
Figure 6A:
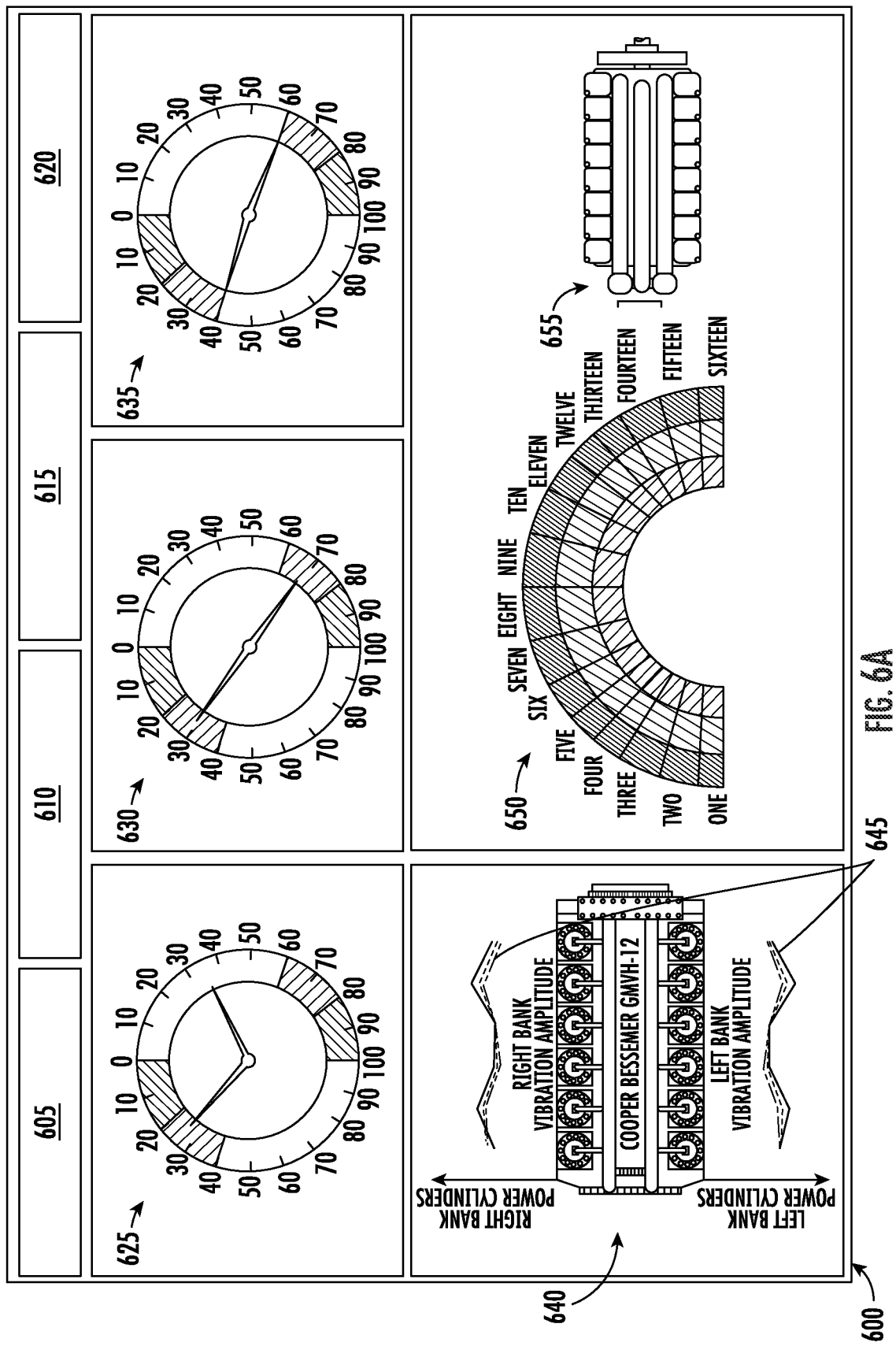
Figure 6B:
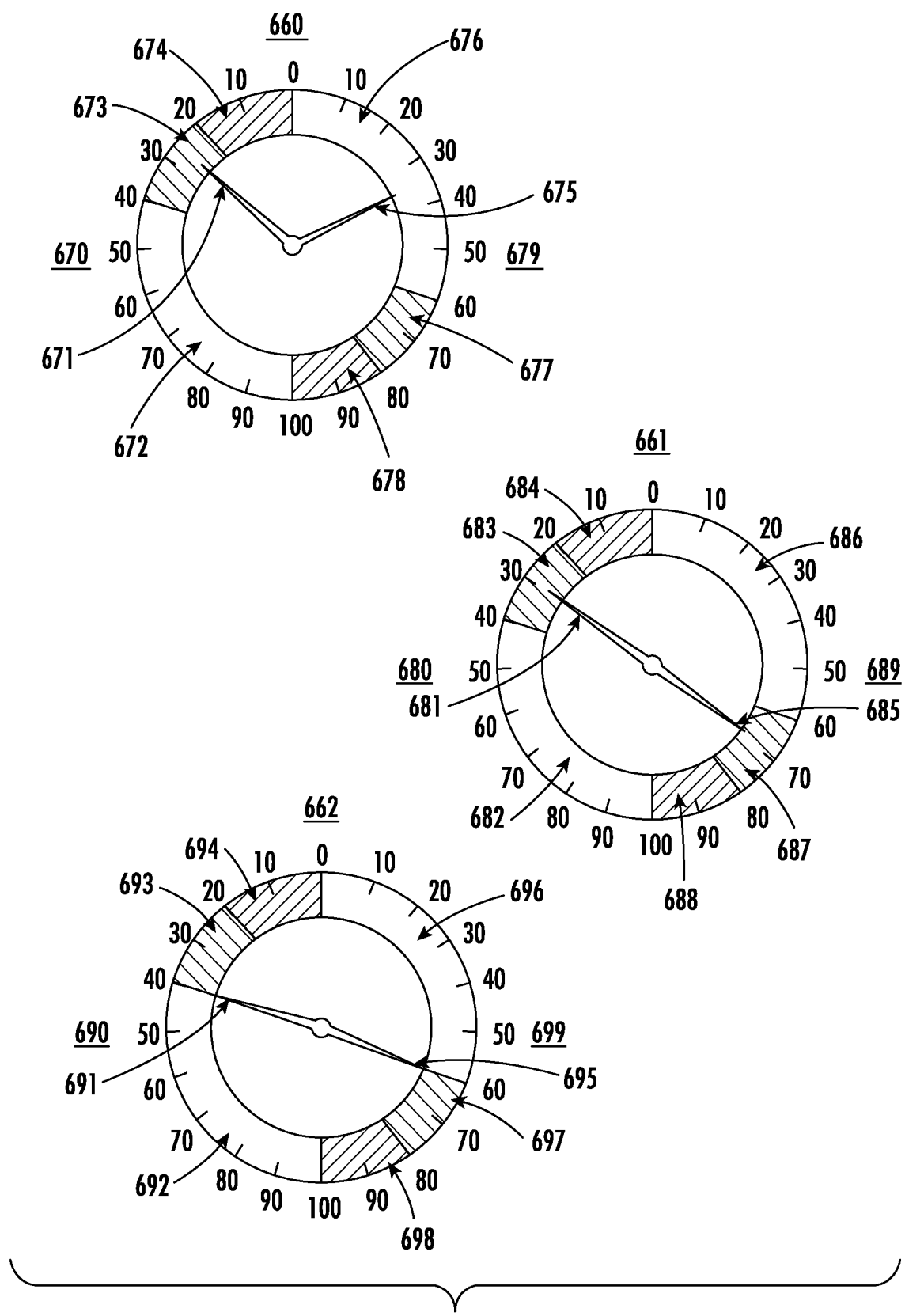

FIB. 4B shows a graphical representation of raw vibration data after phase alignment according to one embodiment of the present disclosure;

FIG. 5 shows a graphical representation of multiple parameter analysis according to one embodiment of the present disclosure;

FIG. 6A shows a visual representation of a dashboard including key performance indicators according to one embodiment of the present disclosure;

FIG. 6B shows a visual representation of an interface including dynamic health indicator icons according to one embodiment of the present disclosure; and FIG. 7 shows a visual representation of an interface including dynamic fault indicator icons according to one embodiment of the present disclosure.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

An Industrial Internet of Things (IIoT) edge device, such as Spotlight for Engines from Windrock Inc., may be adapted for monitoring the mechanical health of high speed reciprocating internal combustion engine as well as other engine types, compressors, and other types of machinery.

Hardware for monitoring HSEs includes one or more accelerometers mounted at a power cylinder of the HSE, peripheral universal connectors (PUC), controller, and gateway. Hardware is preferably designed to be plug and play to reduce electrical work scope such that a typical system can be readily installed.

Figure 1A:
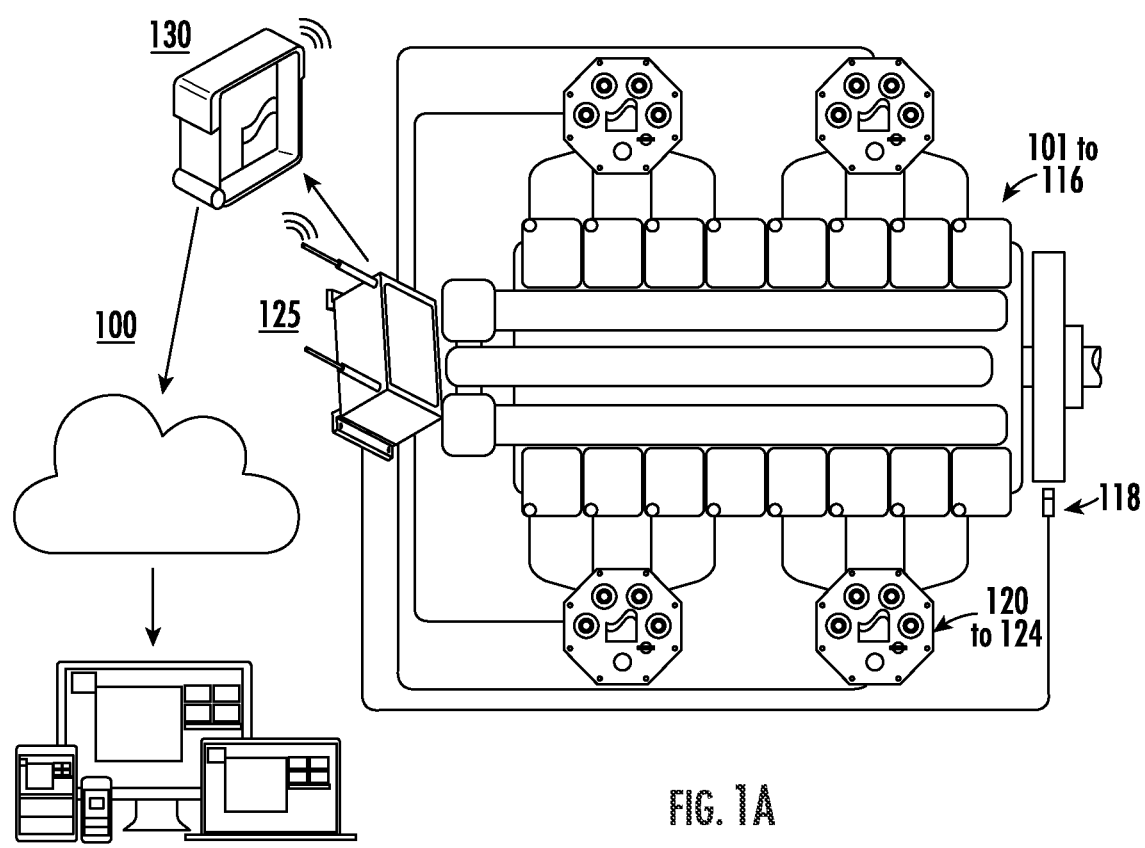
FIGS. 1A and 1B show a system for remote monitoring of engine performance according to one embodiment of the present disclosure.
Figure 1B:
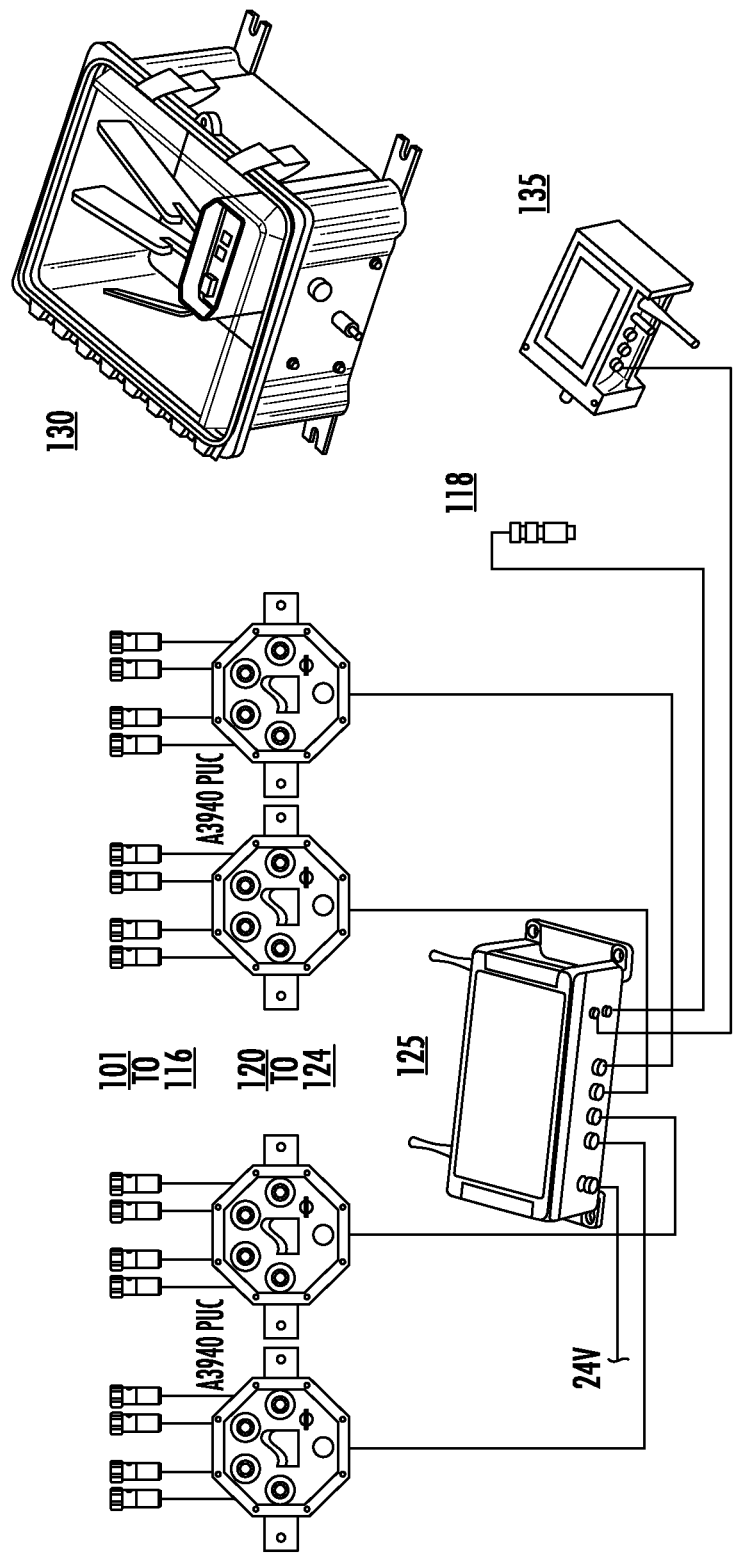

FIG. 1A and FIG. 1B depict embodiments of a system for monitoring mechanical health of a high speed reciprocating internal combustion engine 100. The system for monitoring mechanical health of an HSE engine 100 includes acceleration sensors 102, such as accelerometers, for a 16-cylinder high speed internal combustion engine shown in FIG. 1. The acceleration sensors 102 are mounted in sensory contact with the HSE such that the acceleration sensors receive vibration signals from one or more cylinders of the HSE, such as cylinders 1 to 16 of the HSE of FIG. 1. The system for monitoring mechanical health of an HSE engine 100 further preferably includes a magnetic pickup sensor 118 or a shaft encoder 135 for monitoring angular position of a crankshaft or a camshaft. One or more junction boxes 120, such as PUC devices available from Windrock Inc., are provided, where each of the one or more junction boxes 120 connects acceleration sensors 102 with a single controller. In the embodiment shown in FIG. 1, four junction boxes 120 are provided on one 16-cylinder HSE. The system for monitoring mechanical health of an HSE engine 100 further preferably includes a controller 125 and a gateway 130.

The controller 125 is in wireless communication with the gateway 130, which communicates with a cloud hosted server and database. Data collected includes crank angle and trend variables, including segmental vibration analysis. Data collected according to embodiments herein are preferably displayed on a visual interface, such as a dashboard, to provide key performance indicators, trends, and predictive data analytics. Data may also be downloaded for in depth analysis and investigation.

Embodiments described herein are modular, rapidly installed, and report findings using standardized key performance indicators (KPIs) for valve train, drive train, and combustion. Embodiments and figures herein show engine mounted accelerometers for high speed and slow speed engines.

Standardized KPI's may be used for individual assets and for fleet wide benchmarking, and asset reports from a common dashboard.

Analytical software may be used for in depth analysis and investigation. The software further allows a user to download data from the cloud for further processing and analysis.

Problems are detected, characterized and measured using alarm thresholds and segmental bands automatically set based on machine geometry, installation parameters, and experience on reciprocating engines. Engine analytics may be accomplished using a monitoring system for high speed engines and for compressors as described herein. One or more assets may be monitored from one location to obtain a complete picture of reciprocating assets in a single application. Alarm thresholds and segmental or windowed bands may be set based on unique machine geometry and installation parameters.

Valve train monitoring with segmental vibration analysis allows trending of events related to valve train health (loose lash, tight last, valve recession, etc.) for quick identification of problems.

Power cylinder mechanical condition monitoring with segmental vibration analysis detects power cylinder mechanical problems such as piston slap and ring/liner wear. Windowed vibration analysis to detect power cylinder mechanical problems such as piston slap and ring/liner wear.

Turbo health monitoring is used to monitor vane and blade pass frequency and bearing health using FFT analytics.

Valve trains monitored using windowed vibration monitoring allows trending of events related to valve train health (loose lash, tight lash, valve recession, etc.) for quick identification of problems.

Main bearing and crank shaft health may be analyzed to determine issues such as looseness of the crank shaft and lubrication failures.

Frame vibration may be evaluated to detect structural deficiencies like soft foot, looseness, and misalignment.

Quick and Easy Installation saves time and resources by installing in as little as half a day vs. traditional analyzing systems which can take weeks.

Secure data transmission securely transmits data directly to a Microsoft Azure® or other cloud server using cellular (LTE) or other communications technology without needing to access network gateways.

Remotely accessible data is accessible via a secure enterprise platform for 24/7 access and alerts anywhere and anytime. Industrial internet of things (IIoT) enabled with inference engines and artificial intelligence is used to predict and pinpoint failures long before they happen.

Embodiments described herein help to costs associated with catastrophic failure and repair. Obtained data at a constantly populates a digital ecosystem to deliver the increased productivity and profits.

"Aftermarket" is related products that are sold after an item. Embodiments described herein may include aftermarket products or services comprising installed accelerometers on exterior portions of engine cylinders.

"Alarms today" refers to a total count of parameters that have gone into alarm during an interval, such as within the past 24 hours and is distinguished by having its own KPI with a running log such as a 24-hour log.

"Averaged element by element" is refers to the averaging of readings within a segmental band or window.

"Averaged" is preferred for computing engine KPIs (valve train, combustion, and running gear) for a mean score across all the power cylinders.

"Best" or "mean" or "worst performers from fleet" refers to the best or worst engines in a customer's fleet of engines allowing the customer to know which engine should be analyzed that day through a dashboard to bring up relevant data about these particular engines and power cylinders.

"Combustion mean health score" refers to a health score for each power cylinder and an engine as a whole that is monitoring events that contribute to the combustion process which includes compression pressure (leakage), peak firing pressure (piston slap and detonation), and exhaust blowdown.

"Combustion problems" refers to combustion related issues such as those that affect combustion stability for a power cylinder to reach its operating peak firing pressure that can be related to detonation, pre-combustion, compression pressure, and is distinguished in the present disclosure by being detected using banding on dynamic data and correlations to the mean health score for each power cylinder and the engine has a whole.

"Early" or "late" or "out of band" alarm refers to events that are happening within either early or late bands which are typically ~10 degrees before and after a "Normal" band or window.

"Engine bank" is defined as one side of a "V" style engine such as a V16. A V16 could have either left and right engine banks or odd and even engine banks depending on how the OEM numbered their power cylinders.

"Events at valve closure (vc)" refer to a valve interfering or slamming closed with a high impact, not closing all the way presenting a leak, or having a double closure meaning the valve slammed closed with enough force to bounce back open then close again and these distinguished in the present invention by being detected through banding in the dynamic data that then correlates to the health score.

"High frequency vibration" or "high frequency vib" or HF vib" refers to a vibration measurement which has been pass filtered, such as with a 6 kHz high pass filter, remove relatively lower frequency content and to expose high frequency signal content.

"Loudest" as used herein refers to a highest overall average segmental score and may be used to help distinguish the intake cycle from the exhaust cycle.

"Malfunctions within valve train faults (valve, lifter, cam, etc.)" pertains to issues with the exhaust, intake, or fuel valve that affect the timing of the engine and may automatically be identified within bands and deducting from the overall health score.

"Normal" or "in band" alarm refers to events that are happening at approximately an expected crank angle segmental band such for an engine.

"Raw vib" or "raw vibration" is a vibration measurement signal from an accelerometer including relatively lower frequencies that may be filtered out by a high pass filtered used to expose high frequency signal content in the high frequency vibration measurement.

"Running gear looseness" is defined as pin/bushings or rod bearings that have become loose overtime causing an issue and can be measured using an accelerometer.

"Running gear mean health score" refers to a health score for each power cylinder and the engine as a whole that is monitoring of the gear that helps the machine run smoothly to include pin/bushings and rod bearings.

"Running gear" refers to gear that enables the engine to run smoothly to include the pin/bushing and rod bearings and is detectable using banding on the dynamic data and correlations to the mean health score for each power cylinder and the engine has a whole.

"Segmental" refers to segment further comprising sequence, connection, context and reduplication. In particular intake closure, intake opening, exhaust closure, and exhaust opening are examples of segmental events.

"Segmental band trend" refers to a running trend that is updated each hour of the RMS value that is calculated in a given band that has been configured for an event.

"Segmental vibration analysis" refers to band vibration analysis wherein bands further comprise sequence, connection, context, and replication, which may be applied to bands associated with segmental events exemplified by intake or exhaust opening or closure.

"Threshold" refers to an alarm limit or action level or set point value for a measured parameter.

"Valve timing errors" refers to valves that are opening or closing early or late as compared to OEM specification causing timing issues that are automatically identified using the early or late bands.

"Valve train health" is defined as a health of the valve events to include fuel, intake, and exhaust across the engine power cylinders and is distinguished in the present invention by the scoring method of the events that are identified within the early, normal, and late bands for each valve event per cylinder.

Band Alarm Recommendation

Vibration levels may be monitored through a segmental band or window technique, where bands are created for high and low amplitudes and early and late degrees of crank-angle and two levels of alarm are assigned to early and late segments as well as to the expected crank angle segment.

Figure 2:
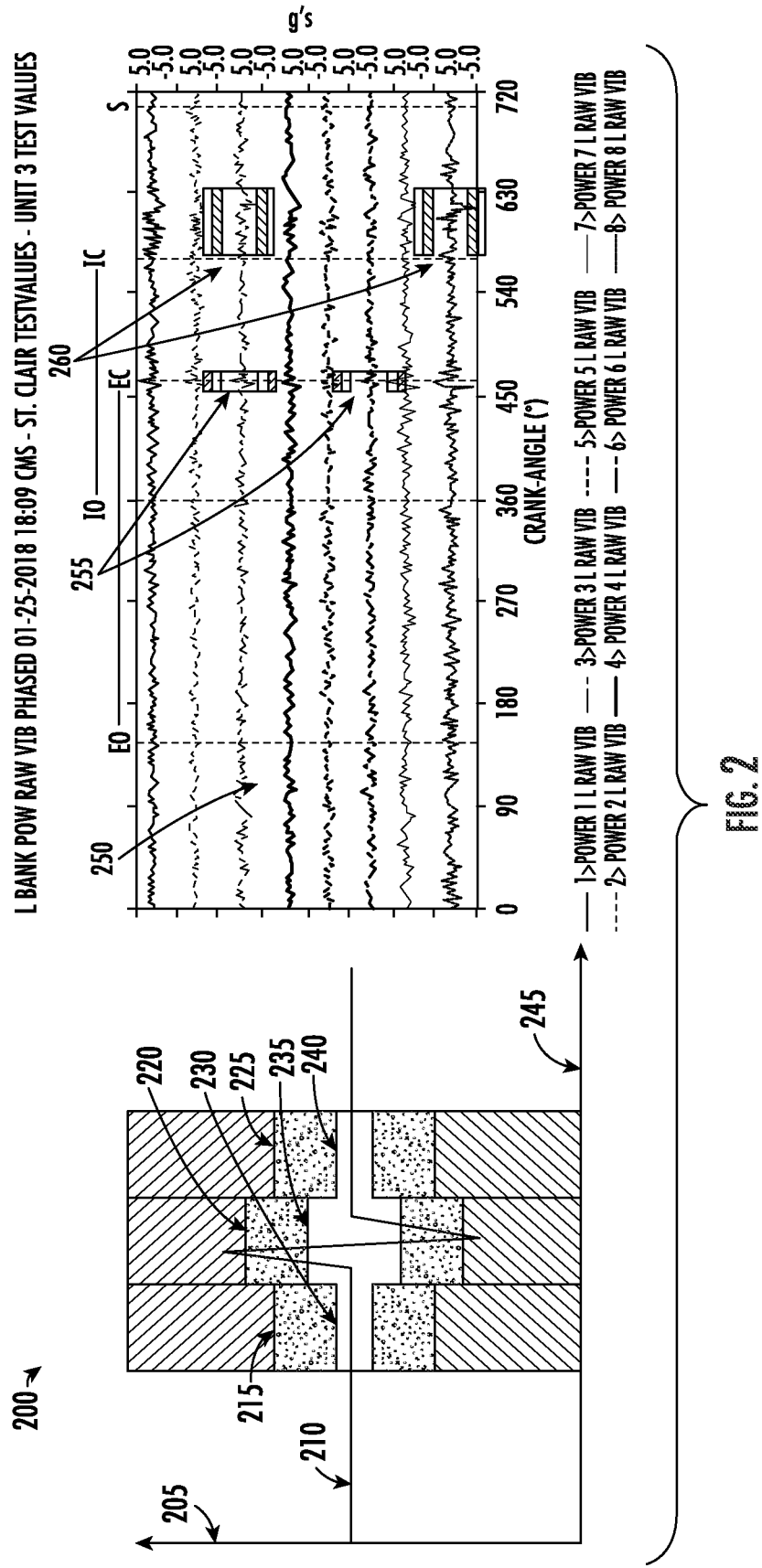
FIG. 2 shows an exemplary segmental alarm with early, normal, and late thresholds according to one embodiment of the present disclosure.

FIGS. 2A and 2B illustrate segmental alarm graphs of selected vibration parameters. On FIG. 2A, graph 200 displays an exemplary segmental alarm with early, normal, and late thresholds. A graph axis 205 is shown representing measurement amplitude typically in g's. A plot 210 showing measurement value versus crank angle is further shown in FIG. 2A. Area 215 indicates high absolute value alarm threshold for an early event segment, area 220 indicates high absolute value alarm for normal event segment, and area 225 indicates high absolute value alarm for late event segment. In a similar manner, area 230 indicates low absolute value alarm for early event segment, area 235 indicates low absolute value alarm for normal event segment, and area 240 indicates low absolute value alarm for late event segment. Note that for each alarm threshold, there may be displayed a positive and a negative limit that are typically similar due to vibration amplitudes tending to resonate above and below a centerline. Line 245 is a graph axis representing crank angle, which is preferably in degrees. Chart 250 of FIG. 2B is a graphical representation showing eight power cylinder raw vibration plots. Highlighted for example on graph 250 are indications 255 and 260 showing relatively narrower and relatively wider segmental alarms overlaid on selected power cylinder raw vibration traces.

A trend point is created and trended for a band alarm recommendation (BAR). High or increasing values suggest possible issues with the engine, and decreasing or low values indicate a relatively healthy engine. High and low alarms may be determined as follows:

High BAR=Engine average vibration across all power cylinders over 50 hours of data with RPM>0+(2× Standard Deviation)

Low BAR=Engine average vibration across all power cylinders over 50 hours of data with RPM>0−(2× Standard Deviation)

Early and late segments are preferably configured 10 degrees before and after a segmental or window band.

Power Cycle Detection

A 4-cycle engine operates over 2 complete crankshaft revolutions. To capture data over these cycles, an encoder (not shown) is preferably connected to an intake camshaft and/or to an exhaust camshaft to monitor precise angle position of the power and intake strokes. This is one preferred method for crank angle domain measurements on 4-cycle reciprocating engines.

Another preferred method uses a top dead center (TDC) reference from a sensor such as a magnetic pick-up viewing an event on a shaft such as a distinguishable characteristic on the flywheel connected to the crankshaft. This measures at least one angular position on the crankshaft turning at 2-times intake and exhaust camshaft speeds. This is practical for aftermarket installation and reduces cost. In this approach, the power and intake cycles may not be differentiated using the TDC reference alone. A power cycle detection method is employed to distinguish a combustion stroke from the intake stroke.

Methods of power cycle detection may operate on waveform arrays, in engineering units, from power cylinder accelerometers. Each accelerometer signal must be timed, with respect to top dead center, and grouped by bank. Methods herein may be performed on data acquired from the engine in any operating condition (part load, full load, etc.). An array of shift values (in degrees) for each waveform is returned. Power cylinder accelerometer signals may also include events related to valve train problems, combustion problems, valve lash, wrist pin, and others.

Methods of power stroke auto-detect automatically detects which revolution in a 4-stroke engine is a power stroke. Bands are created around engine valve event closures for intake and exhaust. Methods described herein evaluate raw vibration and/or high frequency vibration to determine a statistical characterization, such as a kurtosis value within a band and compares it with a band that is setup 360 degrees earlier, which may have a lower overall amplitude. Valve closures may occur during the second revolution and will have a higher amplitude as compared to the valve opening. Once the revolution is detected, methods herein will automatically flip data for each revolution if needed.

A next step determines which segment (0° to 359° or 360° to 719°) is likely an intake stroke of the engine. Assuming the alignment step is completed, the intake cycle will normally be the loudest cycle across all signals from the accelerometers. Power cylinder combustion dynamics and valve problems can create artifacts in individual signals that distort the results. To avoid errors from malfunctions, all waveforms on a single bank are averaged (element by element) to create an average waveform for an engine bank.

Determining a "loudest" event is performed using a statistical method, such as a kurtosis (4th moment) calculation, which provides an indication of valve closure events. Methods include calculating kurtosis for two bands, one from 0° to 359° and the other from 360° to 719°. The band with highest value is the band with the valve closing events. In this case the second band has the highest value. This indicates the valve closing events, as labelled in Figure PDC2, are in the correct location (360° to 719°). Final shifts are shown in TABLE 1.

TABLE 1

| Name | Shift_deg |
| --- | --- |
| 1 > Power 1 L Raw Vib | 0.0 |
| 2 > Power 2 L Raw Vib | 0.0 |
| 3 > Power 3 L Raw Vib | 0.0 |
| 4 > Power 4 L Raw Vib | 360.0 |
| 5 > Power 5 L Raw Vib | 360.0 |
| 6 > Power 6 L Raw Vib | 0.0 |
| 7 > Power 7 L Raw Vib | 360.0 |
| 8 > Power 8 L Raw Vib | 0.0 |

Figure 3:
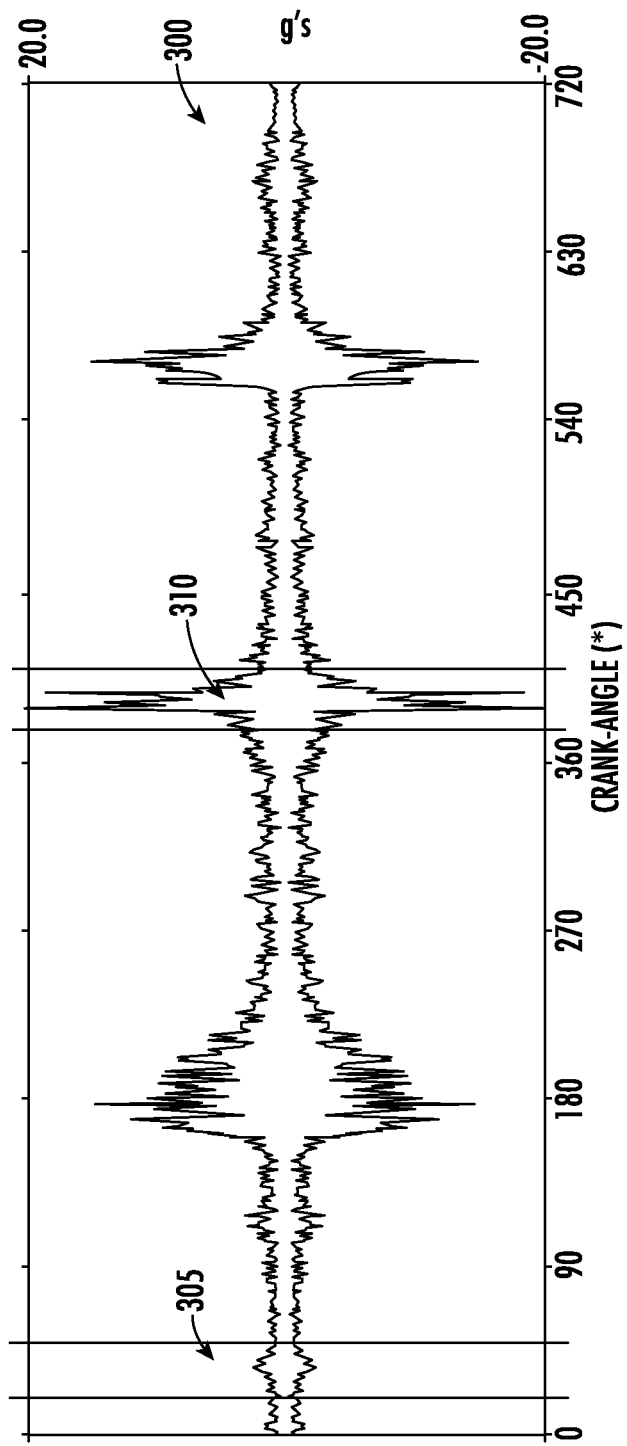
FIG. 3 shows automatic detection of a power stroke and comparison of segmental bands according to one embodiment of the present disclosure.

FIG. 3 is a graph demonstrating how power stroke auto-detection compares bands, which may be separated by 360 degrees. Graph 300 depicts high frequency vibration in g's of amplitude versus 0 to 720 degrees of crank angle. Portion 305 and portion 310 compare a 20 to 40 degree crank angle segment showing relative low loudness with a 80 to 400 degree crank angle segment showing relatively high loudness.

Figure 4A:
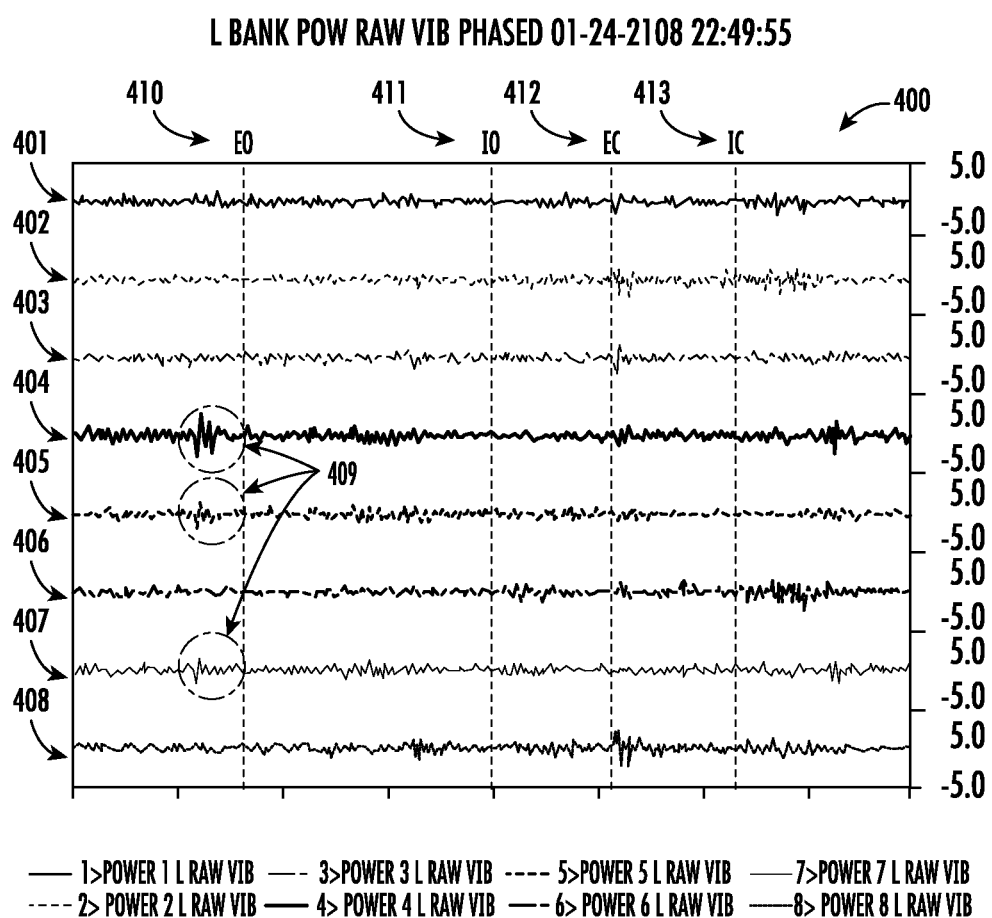
FIG. 4A shows a graphical representation of raw vibration data before phase alignment according to one embodiment of the present disclosure.
Figure 4B:
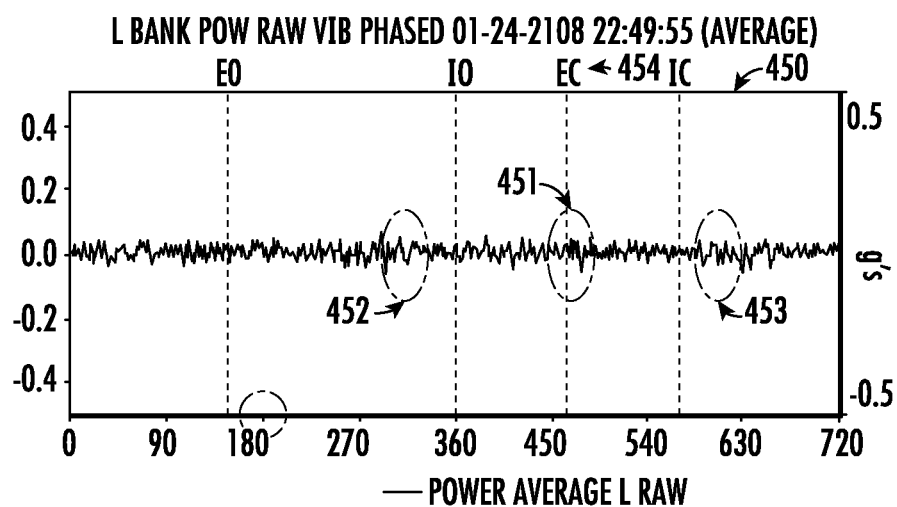

Phase alignment may be achieved by a power cycle detection method. A power cycle detection may require traces to be aligned to generate an average waveform. FIGS. 4A and 4B show raw vibration data acquired on a left bank of a 16-cylinder engine (Waukesha, 16V275GL+). Each plot trace, 401 to 408 represents a power cylinder raw vibration (acceleration) signal corresponding to left bank power cylinders 1 to 8 respectively. The plot includes labels for the valve events, in blue across the top of the plot: 410 valve event exhaust open (EO), 411 valve event intake open (IO), 412 valve event exhaust close (EC), and 413 valve event intake close (IC). Generally, the larger events will occur at exhaust closure. From FIG. 4a it can be detected that items 404, 405, and 407, corresponding to Power 4 L, Power 5 L, and Power 7 L, depict exhaust events that are positioned 360° away from the labeled exhaust closure point. The power stroke auto-detection method corrects misaligned traces so that they all have the same timing (relative to piston position inside the cylinder) and the events are on the correct stroke.

Utilizing data from FIG. 4A, a first trace ("Power 1 L Raw Vib") is fixed and then coefficients are calculated for each of the next signals at their as-found position and shifted by 360°. Analysis of data from FIG. 4A reveals coefficients indicating Power 4L, Power 5L, and Power 7 L are out of phase by 360°.

FIG. 4B presents a graph of vibration after phase alignment. Graph 450 displays averaged raw vibration data acquired on a left bank of a 16-cylinder engine (Waukesha, 16V275GL+) after power stroke alignment. Portion 451 identifies expected events at exhaust valve closure 454. In this trace, exhaust valve closure 451 may be detected, while another event at 452, occurs at approximately 300° crank angle, and yet another event 453, takes place at approximately 600° crank angle.

Vibration Measurements Using Segmental Bands

Preferred vibration measurement and related methods herein include measuring vibration as a function of crank angle using raw vibration and high frequency vibration measurements.

Segmental bands may selectively discriminate raw vibration and high frequency vibration at normal portions of 720° crank angle position. Early segments and late segments are appended to each normal segmental band. Two alarms may be used to automatically identify classify an event's low and high alarm conditions in each early band, normal band, and late band.

Table 2 below provides an example for vibration measurements, segmental bands, early and late bands, for which low and high alarms are applied.

TABLE 2

| Vibration measurements: | Normal segmental band | Early segment | Late segment |
| --- | --- | --- | --- |
| Raw | 0 to 45 | 710 to 720 | 45 to 55 |
| High frequency | 120 to 190 | 110 to 120 | 190 to 200 |
| Raw | 170 to 190 | 160 to 170 | 190 to 200 |
| Raw | 350 to 370 | 340 to 350 | 370 to 380 |
| High frequency | 350 to 390 | 340 to 350 | 390 to 400 |
| Raw | 530 to 550 | 520 to 530 | 550 to 560 |
| High frequency | 550 to 590 | 540 to 550 | 590 to 600 |
| High frequency | 580 to 620 | 570 to 580 | 620 to 630 |
| High frequency | 700 to 720 | 690 to 700 | 0 to 10 |
| Raw | 710 to 10 | 700 to 710 | 10 to 20 |

The example shown in Table 2 above lists 10 expected or normal positions in crank angle where events may be identified. For each normal segmental event, there is a corresponding early band and late band. For each of the 30 bands there are three possible findings: no event detected, low alarm event detected, and high alarm event detected.

Embodiments of an internal combustion HSE monitoring system preferably includes 16 accelerometers mounted on 16 cylinders with 30 bands, and each of those 480 bands reports no alarm, low alarm, or high alarm. Further, there may be additional measurements and indications such as engine speed, and cylinder pressure. The various example bands in Table 2 are selected to reveal event information about categories of combustion health, valve train health, and running gear health associated with the cylinder adjacent to the corresponding accelerometer location.

Table 3 below lists preferred event indications revealed by segmental vibration analysis using segmental banding. The event indications shown in are typically automatically determined for all cylinders monitored on the engine.

TABLE 3

| Category | Event indications |
| --- | --- |
| combustion | piston slap/detonation |
| combustion | exhaust blowdown |
| valve train | exhaust valve |
| valve train | intake valve |
| valve train | fuel valve |
| combustion | compression leak |
| running gear | pin |
| running gear | bushing |
| running gear | rod |
| running gear | bearing |
| running gear | looseness |

Trending and Analyzing Parameters from Segment Band Vibration Data

Parameters from segment band vibration data standardized for individual and multiple parameter trend analysis. FIG. 5 shows a trend plot for multiple parameter analysis. A graphical axis 505 is shown to illustrate scalar amplitude. Line 510 is a graphical axis showing a time interval, such as a recent 24 hours. Marker 515 is a time-synchronized marker indicating concurrent measurements at a given time, such as at 03:00 hours. Portion 520 is an amplitude for power cylinder 9 measured with high frequency vibration corresponding to exhaust blowdown, normal segmental band, and 6.08 g's at 03:00 hours. Portion 525 is an amplitude for power cylinder 9 measured with high frequency vibration corresponding to compression leak, late crank angle band segment, and 2.40 g's. Portion 530 is amplitude for power cylinder 9 measured with raw vibration corresponding to running gear pin, late timing band segment, and 1.70 g's.

In addition to the segmental parameters, preferred embodiments herein may collect other measurements from the available sensors including speed, overall raw vibration, and overall high frequency vibration.

Inference Engine

Segmental parameters from early, normal, and late segments from cylinder vibration traces over time are stored in a database that preferably resides in a cloud server. An inference engine or other artificial intelligence (AI) program may be implemented to analyze collected data and deduce inference information such as one or more of the following: A) periodicity or randomness, B) occurrences amplitudes based on TDC or crank angle or time or speed, C) an occurrence interval or frequency based on TDC or crank angle or time or speed, D) a correlation among parameters, E) a direction crank angle adjustment to improve early or late events faults, and F) a magnitude of crank angle adjustment to improve early or late faults, and G) an impact on numbers of events resulting from a change in one or more low alarms or high alarms.

Observation of the three traces illustrated in FIG. 5 indicates corresponding upward and downward variations among the three different measurements. Therefore, an operator may use trend plots to identify correlation between event indications and other measurements. Auto correlation and co-variance as shown in this three variable short duration example are more easily and comprehensively performed using inference engine and programmed logic to analyze the 16 cylinder traces, with 10 segmental bands per trace, with 10 early bands and 10 late bands per trace, and two level alarm status indications for each early, normal and late band, as described above.

An inference engine provides useful feedback, information, and computed results to the operator. The inference engine is preferably configured for iterative analysis. The inference engine operates on chronologically tabulated measurement parameter data to identify multi-parameter correlations better than what an operator may visual distinguish using graphical data in FIG. 5. Embodiments herein further distinguishes lack of correlation among a plurality of parameters. The inference engine use FFT or other transforms to characterize magnitudes, patterns and occurrence frequencies.

Embodiments of the inference engine disclosed herein may systematically evaluate historical parameter traces and step through iterative incremental adjustments, then analysis, followed by adjustment and additional analysis. For example, an inference engine may study and report impact of segmental placement and dimensioning through analyzing recorded measurement data traces from 16 cylinders repetitively while making iterative incremental adjustments to early, normal, and late segment crank angle placements. In another example, an inference engine may study one set of data from 16 cylinders multiple times while making iterative incremental adjustments to segment low and high alarms between each pass for the purpose of recommending or automatically adjusting low and high alarms for the newly adjusted early, normal and late bands. Further, the inference engine may perform similar iterations on a next set of data, and another, and another, until incremental improvements are small or indistinguishable.

Key Performance Indicators (KPIs)

User Interface dial graphs are preferably generated to display KPI's for the engine. For example, FIG. 6A shows a dashboard 600 for key performance indicators (KPIs). The dashboard 600 preferably includes multiple window portions displayed on the dashboard 600. In preferred embodiments, an operator is likely to arrange windows as preferred using one or more of the following window displays.

Display window 605 shows any alarms today and alarms in an interval, such as within a previous 7 days. Display window 610 shows valve train mean health score, best performer(s) in a relevant fleet, and worst performer(s) in a relevant fleet. Display window 615 shows combustion mean health score, best performer(s) in a relevant fleet, and worst performer(s) in a relevant fleet. Display window 620 reports running gear mean health score, best performer(s) in a relevant fleet, and worst performer(s) in a relevant fleet.

Display window 625 shows a dynamic graphic icon that visually displays information about measured valve train events which are within normal crank angle positions and events which are early or late with respect to normal segmental crank angle position. Display window 630 illustrates a graphic icon that displays information about measured combustion events that are within normal crank angle positions and events which are early or late with respect to normal segmental crank angle position. Display window 635 shows a graphic icon to convey information about measured running gear events which are within normal crank angle positions and events which are early or late with respect to normal segmental crank angle position.

An operator or analyst typically desires to know if valves of an engine are opening and closing on time or in accordance with their OEM spec. If a valve opens early, then more gas could go into the cylinder and cause detonation. Valve events correlate to timing of the engine. Operators desire for valves to open to let in the fuel and close when the air/fuel mixture is being ignited then reopen to let out the exhaust. If valves are opening or closing early or late, engines performance and efficiency is degraded, which could result in higher emissions, increase fuel consumption, etc. The displays of FIG. 6A alert an analyst to what percentage of the KPI events are occurring within OEM spec or are happening early or late. The displays of FIG. 6A correlate to the efficiency of the engine as in if the events for KPIs are happening late or early it will lower the efficiency.

A first engine diagram 640 is displayed and bounded by lines 645 and provides a dynamic graphic icon to convey information about measured valve train, combustion, and running gear event indications shown cylinder-by-cylinder. A proximity of measurement indications 645 and piston positions in display window 640 provide an intuitive and readily understood interpretation of cylinder and engine health.

A second engine diagram 655 is graphically associated with a dynamic graphic icon 650 to convey information about measured valve train, combustion, and running gear event indications shown cylinder-by-cylinder. The proximity of measurement indications 650 and piston positions in item 655 provide an intuitive and readily understood interpretation of cylinder and engine health.

FIG. 6B illustrates additional detail display windows of FIG. 6A including valve train dynamic health indicator graphic, combustion dynamic health indicator graphic 630, and running gear dynamic health indicator graphic 635.

Display window 660 preferably includes a label providing that this dynamic graphical icon represents valve train health. Portion 670 reports average percentage of valve train events occurring during a normal expected segmental band, "Normal Events (27.08%)". Dial indicator pointer 671 also reports ~27% normal segmental events. A portion of a dial 672 is shown within which healthy valve train events are expected to occur. In the portion of the dial 672, it is expected that from about 40% to 100% of events for healthy operation of an engine should occur in a designated normal segment. A percentage 673 of valve train events that are occurring within the normal segmental band that between 20% and 40% suggests a yellow or low alarm condition for valve train health condition. Portion 674 shows that when only 0 to 20 percent of valve train events occur with the normal segmental band, then this alarm condition is red or high alarm. Dial indicator pointer 675 reports ~35% late or early valve train event occurrences. Items 676, 677, and 678 designate health (0% to 60%), low alarm (60% to 80%) and high alarm (80% to 100%) gradings for late or early event occurrences. Report 679 shows "35.42% Late or Early Events" consistent with the corresponding analog score of dial indicator pointer 675.

With further reference to FIG. 6B, item 661 visually indicates a dynamic graphical icon representing combustion health. Item 680 reports average percentage of combustion events occurring during a normal expected segmental band, "Normal Events (28.13%)". Item 681 dial indicator pointer also reports ~28% normal segmental events. Item 682 identifies a portion of a dial within which healthy combustion events are expected to occur. 40% to 100% of events shown at 682 for healthy operation should occur in a designated normal segment. Item 683 visually represents a percentage of combustion events occurring within a normal segmental band such that between 20% and 40% suggests a yellow or low alarm condition for combustion health condition. Item 684 shows that when only 0 to 20 percent of combustion events occur with the normal segmental band, then this alarm condition is red or high alarm. Dial indicator pointer 685 of FIG. 6B visually shows ~69% late or early combustion event occurrences. Items 686, 687, and 688 designate health (0% to 60%), low alarm (60% to 80%) and high alarm (80% to 100%) gradings for late or early event occurrences. Item 689 reports "68.75% Late or Early Events" consistent with the corresponding analog score of item 685.

Item 662 visually indicates that dynamic graphical icons illustrated represent running gear health. Item 690 reports average percentage of running gear events occurring during a normal expected segmental band, "Normal Events (39.58%)". Item 691 dial indicator pointer also reports ~40% normal segmental events. Item 692 identifies a portion of a dial within which healthy running gear events are expected to occur. In the graphic of FIG. 6B, 40% to 100% of events for healthy operation should occur in a designated normal segment. Item 693 shows that a percentage of running gear events occurring within the normal segmental band that between 20% and 40% suggests a yellow or low alarm condition for running gear health condition. Item 684 shows that when only 0 to 20 percent of running gear events occur with the normal segmental band, then this alarm condition is red or high alarm. Item 695 dial indicator pointer reports ~68% late or early running gear event occurrences. Items 696, 697, and 698 designate health (0% to 60%), low alarm (60% to 80%) and high alarm (80% to 100%) gradings for late or early event occurrences. Item 699 reports "68.75% Late or Early Events" consistent with the corresponding analog score of item 695.

Key Performance Health Scores

Key performance indicator (KPI) health scores are preferably derived for each individual cylinder and also averaged for all cylinders on an engine. Table 4 below summarizes exemplary KPI health scores in three major categories: valve train, combustion, and running gear. Each KPI will report the Mean Health Score, Best Performer, and Worst Performer.

TABLE 4

Table 1. Example KPI Health Scores

| KPI | Score | Event | Problem |
| --- | --- | --- | --- |
| Valve Train | 84 | Exhaust | Tight or Loose Valve Lash, Early or Late Timing, Lifter, Cam, Follower, Recession |
| | 72 | Intake | Tight or Loose Valve Lash, Early or Late Timing, Lifter, Cam, Follower, Recession |
| | 60 | Fuel | Tight or Loose Valve Lash, Early or Late Timing, Lifter, Cam, Follower, Recession |
| | 48 | Intake and Exhaust | Tight or Loose Valve Lash, Early or Late Timing, Lifter, Cam, Follower, Recession |
| | 36 | Fuel and Exhaust | Tight or Loose Valve Lash, Early or Late Timing, Lifter, Cam, Follower, Recession |
| | 24 | Intake and Fuel | Tight or Loose Valve Lash, Early or Late Timing, Lifter, Cam, Follower, Recession |
| | 12 | Intake, Fuel, and Exhaust | Tight or Loose Valve Lash, Early or Late Timing, Lifter, Cam, Follower, Recession |
| Combustion | 75 | No Exhaust Blowdown | Exhaust Valve |
| | 50 | Piston Slap/Detonation | Peak Firing Pressure, Air/Fuel Mixture, Early or Late Timing, Valve Events, Ignition System, Piston Rings |
| | 25 | No Exhaust Blowdown and Piston Slap/Detonation | Peak Firing Pressure, Air/Fuel Mixture, Early or Late Timing, Valve Events, Ignition System, Piston Rings |
| Running Gear | 80 | 1 Impact at 0, 180, 360, or 540 | Loose Pins, Bushings, Rod Bearings at reversal |
| | 60 | 2 Impact at 0, 180, 360, or 540 | Loose Pins, Bushings, Rod Bearings at reversal |
| | 40 | 3 Impact at 0, 180, 360, or 540 | Loose Pins, Bushings, Rod Bearings at reversal |
| | 20 | 4 Impact at 0, 180, 360, or 540 | Loose Pins, Bushings, Rod Bearings at reversal |

Valve Train KPI Score

A KPI score for a valve train will preferably be a number from 0-100, where 100 is a healthy engine and 0 is a combination of faults.

Cam and lifters act on valves of the valve train to open and close the valves.

Because valves are driven by mechanical systems, events should occur at a same point in a piston stroke for each cylinder. Events that occur late or early can be an indication of a problem in the valve train.

Errors in valve timing can be detected using segmental bands on the accelerometer signal on the exhaust closing (EC) and intake closing (IC) events. For example, three segmental bands configured around the EC and IC events may be used. Both events have a similar setup. A middle band indicates the health of the normal band events determined from statistical survey of data Validation and adjusting of thresholds may be confirmed with data from historical testing. Segmental bands on either side of the normal band detect early or late closings. When the threshold is exceeded in either of these two segments the waveform is tagged as late or early.

Combustion KPI Score

A KPI score for the combustion characteristics is preferably a number from 0-100, where 100 is a healthy engine where exhaust blowdown is present and 0 is a combination of faults.

Combustion KPI is preferably based on assessment of the combustion and sealing effectiveness of the cylinder on the Hi vib (6-25 kHz) signal. Embodiments herein preferably include three segmental bands each of the power cylinder traces.

Running Gear KPI Score

A KPI score for score for running gear is preferably a number from 0-100, where 100 is a healthy engine and 0 is a combination of faults. Running gear KPI's assess the mechanical condition of the wrist pin and rod bearing clearance on the Raw vib. Embodiments herein may designate five segmental bands, on each of the power cylinder traces. Each band results in a trend tag.

Intuitive Graphic Icon

Interpreting information found in engine condition monitoring waveforms and spectra systems is not intuitive for many industrial professionals who are well experienced in engine operation and repair. Embodiments herein include a method and apparatus providing a simply intuitive dashboard display format that conveys meaningful HSE condition and operation information for immediate understanding by all interested persons.

Preferred embodiments include the following: a monitoring system for high speed engines (HSE); the monitoring system may include personal or cloud-based computing for serving, storing, databasing, networking, software, analytics, and intelligence; the cloud or other computing monitoring solution supports a dashboard interface; the dashboard enables near real-time, and as often as may be needed, measurement data to be viewed and analyzed; analyzed measurement data is collected from sensory devices, including accelerometers that are mounted on the power cylinders of a HSE; the sensory devices typically stream analog signals which are processed and digitized by the controller a controller, such as the Windrock Inc. Spotlight controller; after being processed by a controller, such as the Spotlight controller, the processed data stream is transmitted to the host cloud computer, such as through a gateway; hosted data can be viewed using the dashboard; the dashboard displays plots where the power cylinders are overlaid over time to easily detect, quantify, and characterize normal and abnormal performance; a fully customizable cloud-based enterprise dashboard, such as Windrock Inc. Enterprise, can be used with any device that has internet access; faults are visually easy to see by an employee who is not a trained analyst or domain expert; a fault is a mechanical issue with the engine and is recognized by the curve deviating from the average; data gets collected and compared on periodic intervals based on time or condition, for example each hour and the left/right banks of the engine can be compared.

Preferred embodiments include displaying graph condition information in geometric proximity to diagram of the HSE cylinders from which measurement information is collected. For example, HSE diagrams may be displayed in place of an abscissa and parameter scalar values over time are plotted against a quantitative ordinate scale. It is intuitive for a user to notice the end to end symmetry and left to right symmetry for these data points. Ordinate scale with preferred linear or amplified or logarithmic or other disproportioned spacing may be added with or without dimensional citing. The selection is chosen to simple, intuitive, and effective for the diverse audience.

Graphing condition information in geometric proximity to a diagram of the HSE presents condition information in a manner easily understood or grasped using a basic level of practical knowledge and judgement, not necessarily based on specialized knowledge. An observer immediately grasps these aspects with little or no instruction. The HSE diagram communicates front, back, left, right, cylinder positions, bilateral symmetry (left to right), end cylinders, middle cylinders, for example. Proximity graphed measurements with diagrams are clearly understandable and simple. With little effort, a user differentiates multiple measurements from each other while associating each one with its physical measurement location on the machine. Measurements are not confused with each other and cylinders are not confused with each other. It is simple and it is obvious.

Symmetries and asymmetries are also easy to grasp and interpret. A user interprets bilateral differences portrayed by the expanding or contracting condition monitoring graphics. Expanding, moving farther from the core diagram, is analogous to swelling, the condition is measuring more, louder, with greater amplitude. Shrinking, moving closer to the core diagram, is analogous to less, quieter, with lesser amplitude. It is common sense also for observers to notice end to end differences and to notice center to end differences, implying contribution or isolation from neighboring cylinders.

Temporal observations are naturally easy to observe, grasp, and interpret using commonly understood experiences. Intermittent amplitude bursts or silences are attention getting observations. By depicting a temporal cascade or array or sequence, the observer naturally notices the stronger and weaker depictions when and where they occur.

Observers bring these common abilities for discerning diagrams and graphs along with diverse levels of specialized knowledge and understanding. By graphing condition information in geometric proximity to the diagram of the HSE most people can detect an understand enough about a potential over or under amplitude observation to prompt inquiry from one with special knowledge or understanding for some explanation and clarification.

A parameter scalar value graphed on an ordinate amplitude against abscissa (diagram of engine) provides a relative score compared with measurements from sensory devices placed in similar configuration on other engines of the same HSE. A measurement technique appropriate for detecting and quantifying faults of interest using relative comparison is one with signal to noise sufficient to differentiate between normal and fault conditions. The following situations are to be avoided when selecting sensor, mount, and signal processing used to produce the parameter values: high vibration overloads or rails out measurement, excessive noise compared with signal information, and indistinguishable proximity of fault between the various sensor locations.

The parameter scalar value graphed on an ordinate amplitude against abscissa (diagram of engine) is typically filtered using physical filters or electronic filters. Preferred filter selections include one or more of the following: a pass filtering process such as high pass or band pass or low pass; an averaging filtering process such as average or median or root-mean-squared (RMS), a distribution detection filtering process such as a peak hold or a standard deviation or a cumulative distribution or a histogram.

The item 700 left portion of FIG. 7 represents a healthy engine. In this case a healthy engine is revealed by the fact that readings are all with 2 standard deviations of recent history and/or of each other. Please note that the simplest form, ordinate with no scale is chosen.

The item 750 middle portion of FIG. 7 represents a HSE with a detonation issue. It can be seen that the vibration trends for both the left and right bank of the engine are close together. The detonation issue causes an easily recognized high range vibration reading compared to other times and to the other cylinders. On a HSE, a high vibration reading would mean that the cylinder is detonating meaning that the air-fuel mixture is too rich and an explosion is happening inside the cylinder.

The item 780 right portion of FIG. 7 represents a HSE with a no-combustion issue. The plot shows the vibration reading is low on one cylinder when compare to the other cylinders. This plot shows that power cylinder 3 has no combustion. No combustion means that ignition is not occurring for one of several possible causes: the spark plug (gasoline), low compression (diesel), incorrect air-fuel mixture inside the cylinder, or other.

FIGS. 7A-7C outline features for dynamic vibration fault indicator icons. FIG. 7A includes a dynamic vibration icon 700 representing a not-detonating engine condition. A twelve-cylinder engine diagram 705 is also displayed. Item 710 shows multiple right bank vibration parameter graphs with each proportioned measurement positioned in a location proximate to its respective right bank cylinder. Multiple left bank vibration parameter graphs 715 are shown in proximity to respective left bank cylinders. A closeness of three right bank and three left bank measurement traces visually indicates recent measurement amplitude consistency.

Referring to FIG. 7B, a dynamic vibration icon 750 is shown for an engine which experienced a right bank cylinder detonation event for one of the 6 right bank cylinders. A twelve-cylinder engine diagram 755 is displayed. A graphical indication for a high frequency vibration measurement from one right bank cylinder having relatively high amplitude 760 is also displayed. Increased amplitude indicates characteristic of a possible detonation type event. Item 765 illustrates two additional high frequency vibration measurements from the same right bank cylinder as measurements 760 and 765. Right bank cylinder 770 is identified adjacent to accelerometer from which vibrations 760 and 765 were collected. Left bank vibrations 775 are also shown.

FIG. 7C shows a dynamic vibration icon 780 for an engine experiencing a no-combustion event on one cylinder proximate to item 785 where high frequency vibration is relatively quite low.

The engine diagram of FIG. 6A includes item 655 and dynamic graphic icon item 650 which may be configured to graphically associate cylinders with vibration measurement results which are intuitive and easy to comprehend. In one embodiment, one step includes associating the cylinder diagram with graphical proximity to the dynamic graphical vibration information using proximate position or other intuitive position association between engine diagram and graphical information.

Embodiments described herein are international, multilingual, and are easily interpreted by any person anywhere in the world. A quick start guide including example diagrams showing each likely fault condition which is distinguished using the simple and intuitive graphic may be included.

A further embodiment may include adding text or icons to further assist the user. For example, a normal icon is green dot or happy face. In another example, a detonation fault icon is a red dot or an exploding star in vicinity of the faulty cylinder. For yet another example, a no combustion fault icon is a blue dot or a plug diagram with no spark.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for aligning cycles of an engine conditioning monitoring system, the method comprising:
    receiving data corresponding to a TDC angle of an engine from a crank angle sensor in sensory contact with the engine;
    receiving data from one or more accelerometers in sensory contact with each cylinder of the engine, the received data including vibration amplitude data;
    analyzing vibration amplitude data from the one or more accelerometers in relation to data corresponding to the TDC angle of the engine;
    characterizing vibration data from the one or more accelerometers using segmental band analysis, wherein segmental bands of the segmental band analysis correspond to valve closure angles of the engine;
    identify cylinders for which analyzed vibration amplitude data in relation to the TDC angle of the engine are out of phase; and
    align vibration amplitude data by shifting analyzed vibration amplitude data relative to the TDC angle of the engine such that vibration amplitude data is aligned with the TDC angle of the engine.

2. The method of claim 1, further comprising providing a visual interface on a display of a computer and visually displaying vibration amplitude data on the display of the computer.

3. The method of claim 1, further comprising identifying valve timing errors using the segmental band analysis.

4. The method of claim 3, further comprising identifying valve timing errors based on determined early and late closing of valves as compared to specifications of the engine.

5. The method of claim 1, further comprising displaying condition information in proximity to a visual representation of cylinders of the engine.

6. The method of claim 5, further comprising displaying a condition graph in proximity to cylinders of the engine, wherein the condition graph represents a condition of each cylinder of the engine.

7. A method for analyzing performance of an engine, the method comprising:
    receiving data corresponding to a TDC angle of an engine from a crank angle sensor in sensory contact with the engine;
    receiving data from one or more accelerometers in sensory contact with each cylinder of the engine, the received data including vibration amplitude data;

aligning received data corresponding to the TDC angle of the engine with received data from the one or more accelerometers;

applying segmental banding to the aligned received data corresponding to the TDC angle of the engine and the received data from the one or more accelerometers;

analyzing vibration amplitude data from the one or more accelerometers to determine one or more parameters for segmental bands;

identifying one or more events based on the one or more parameters for segmental bands, the one or more events selected from the group consisting of piston slap, detonation, exhaust blowdown, exhaust valve closure, intake valve closure, fuel valve malfunction, compression leak, pin abnormality, rod abnormality, bushing abnormality, or bearing abnormality; and deriving a key performance indicator score for a health category of the engine based on the one or more identified events, the health category selected from the group consisting of valve train health, combustion health, and running gear health.

8. A method of visually displaying engine cylinder health data to an operator of the engine, the method comprising:

receiving data corresponding to a TDC angle of an engine from a crank angle sensor in sensory contact with the engine;

receiving data from one or more accelerometers in sensory contact with each cylinder of the engine, the received data including vibration amplitude data;

aligning received data corresponding to the TDC angle of the engine with received data from the one or more accelerometers;

applying segmental banding to the aligned received data corresponding to the TDC angle of the engine and the received data from the one or more accelerometers;

analyzing vibration amplitude data from each segmental band to generate a health score for each segmental band;

displaying a visual representation of the engine including a visual representation of relative positions of each cylinder of the engine and;

displaying a visual graph in proximity to the displayed visual representation of the engine, the visual graph displaying relative amplitudes for health scores for each segmental band.

* * * * *